Figure 1:
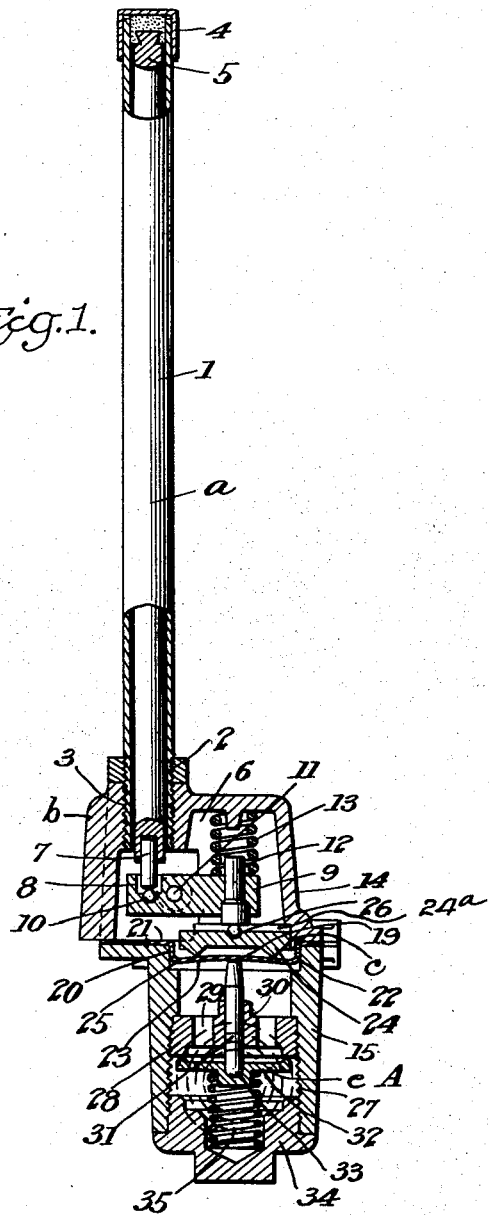

May 16, 1933.  O. J. KAY  1,908,765

THERMOSTATIC PILOT CONTROL

Filed Aug. 23, 1929

INVENTOR,
Oscar J. Kay;
BY
ATTORNEY

Patented May 16, 1933

1,908,765

UNITED STATES PATENT OFFICE

OSCAR J. KAY, OF LOS ANGELES, CALIFORNIA, ASSIGNOR TO GENERAL WATER HEATER CORPORATION, OF LOS ANGELES, CALIFORNIA, A CORPORATION OF DELAWARE

THERMOSTATIC PILOT CONTROL

Application filed August 23, 1929. Serial No. 387,902.

This invention relates to thermostatic controls for hot water heaters, and has for an object the provision of a control so arranged and constructed as to permit ready adjustment of the control in accordance with temperature conditions.

Thermostatic controls are often sold separately from heaters, or heaters are shipped to different parts of the world, with the result that a thermostatic control which has been adjusted at the point of shipment will not always function properly at some other location, due to temperature difference. It is, of course, realized that the thermostatic control can be adjusted at each point, but this is not always easy of accomplishment by plumbers who are not entirely familiar with the control or the heater. It is with the idea of overcoming certain of these disadvantages that the present invention is primarily directed. Where a thermostatic control utilizes what is known as a snap action disc such as, for instance, illustrated in the patent to William A. Merrick, No. 1,542,712, granted June 16, 1925, it is necessary that this snap action disc should have movement past its center within 15° or 20° temperature difference, and to accomplish this, the thermostat for such a control is usually set at approximately 150°. However, if the thermostat was set for one temperature in a given locality and the thermostat control and heater were shipped to a very cold climate, it is evident that considerable strain would be imposed upon the snapping disc. This is not desirable and to overcome this, certain prior investigators have attempted to utilize some form of lost motion device.

The present invention has for an object the provision of means adapted to be readily regulated, to the end that a snapping disc does not have undue strain imposed thereon. More specifically one of my objects is to provide a construction which will permit an unlimited amount of contraction of the thermal element without increasing the regular strain to which the snap-disc is normally subjected.

A further object is the provision of a thermostatic control not utilizing a lost motion principle.

A further object is the provision of a thermostatic control adapted to operate at its original set temperature difference and regardless of climatic conditions.

Another object is the provision of a thermostatic control so arranged and constructed as to be easy of adjustment, economical in cost of manufacture, and generally superior.

With the above mentioned and other objects in view, the invention consists in the novel and useful provision, formation, construction, association and relative arrangement of parts, members and features, all as shown in a certain embodiment in the accompanying drawing, described generally and more particularly pointed out in the claims.

Figure 2:
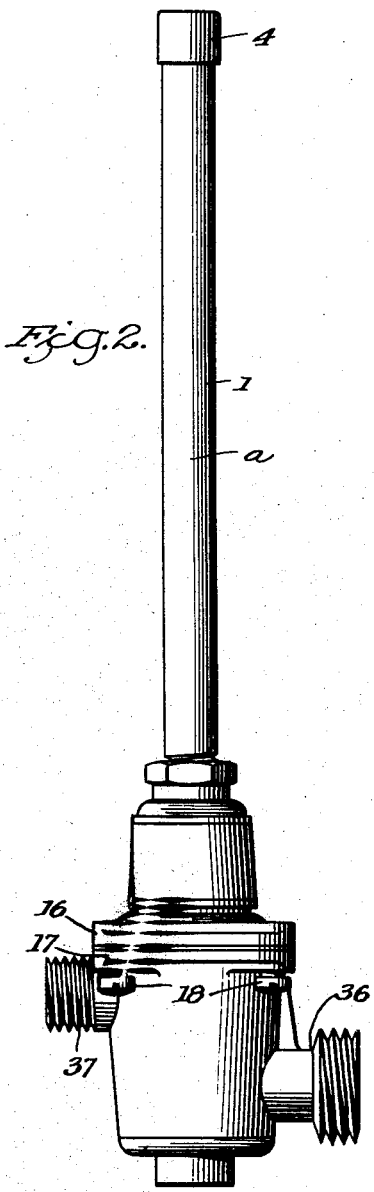

In the drawing:

Figure 1 is an elevation, partly in section, of one form of an improved pilot control, and Figure 2 is an elevation of the control shown in Figure 1.

Referring now to the drawing, the pilot control is designated as an entirety by A, and in which $a$ is a thermostat adapted for reception within a housing $b$, within which housing is confined a diaphragm $c$, which diaphragm is adapted to be controlled by the thermostat $a$ to in turn actuate a valve assembly $e$ whereby flow of gas through the housing may be commenced or stopped. The thermostatic portion of the invention $a$ includes the usual expansion tube 1 which is threaded at 2, whereby the same may be screw-threadedly secured to the housing $b$, as shown at 3. This tube carries a cap 4 and within said tube and closed by the cap 4 is a push rod 5. This push rod extends within the housing $b$ and particularly the chambered portion 6 thereof. Said push rod is bored inwardly from one end thereof to receive a pin 7, which pin in turn is received within a bore 8 for contact with a roller 10 socketed in a lever 9. This lever is pivotally mounted on oppositely disposed pins such as pin 11 screwed in through the wall of the casing or housing. The head of the lever carries a pin 12, a portion of which is received within the confines of a coil spring 13, (to retain the spring) and which coil spring urges the said lever to rotate in a clockwise direction from the showing of Figure 1, and thus maintain the other end of the lever against the end of the push rod. The housing $b$ is formed in two parts, as shown at 14 and 15, with the said parts provided with cooperating flanges 16 and 17, and means 18 for holding the flanges in position of cooperation. Adapted to be interposed between the two parts of the housing and between the flanged portion is the diaphragm $c$, which is of the snap type, that is to say, the diaphragm is bulged or concaved, as shown at 19, in such a manner that when the diaphragm is pushed downwardly, the so-called bulge will move past the center to in turn cause movement of some other element and when pressure is relieved from the diaphragm, the diaphragm will snap back to its original concave position. In other words, the diaphragm shown in the drawing is of shallow cup form, being provided with an up-turned cylindrical wall with a horizontal marginal flange 21. This flange 21 of the diaphragm is the part that is secured between the flanges 16 and 17 and said diaphragm is confined within an enlarged concavity or counterbore at 22 of the portion 15 of the housing in such a manner that when the diaphragm performs its snap action, the up-turned flange portion 20 tends to move inwardly or outwardly to accommodate such snap movement of the diaphragm. Adapted to rest against a portion of the convex surface 23 of the diaphragm (as seen in Fig. 1) is a bridge or bridge member 24. This bridge comprises a rigid disc provided with an annular flange 25, the flange being formed to present a sharp-edged portion to the diaphragm. Thus, it is evident that this disc through the medium of the flange, bridges the center portion of the diaphragm. The top portion of the bridge is provided with a bearing 26 and the pin 12 is adapted to contact with this bearing. The portion 15 of the housing is internally screw-threaded at 27 to receive a valve cage seat 28. This valve cage seat is in the form of a nut and provided with one or more transverse openings 29 with a central portion of said cage bored at 30 to guide a valve stem or pin 31.

The bridge member is guided in a partial bore 24a formed in the valve casing so that it can move toward or from the diaphragm.

The valve cage constitutes a portion of the valve assembly $e$, and said valve assembly likewise includes a valve disc 32 which carries an end 33 of the pin 31. A plug 34 is screw-threaded to the threads 27 of the part 15 and the said plug is formed to accommodate a coil spring 35, which coil spring bears against the valve disc 32 and normally urges said disc to seat against the valve cage 28, as shown in Figure 1. When the parts are in the position illustrated in Figure 1, the upper extremity of the pin 31 is slightly spaced from and within the concavity of the diaphragm 19. Entrance within the chamber portion of the part 15 of the housing is permitted by the means 36 and 37, the parts 36 and 37 being respectively below and above the valve cage.

The operation of the device just described is as follows:

This particular device is utilized as a pilot control and the gas line is connected at 36, and the main burner at 37, to the end that if the gas supply to the heater should drop to a point where the pilot light would go out, the gas supply to the main burner will be shut off.

If a house is closed up with the heater left in condition for operation with the pilot light burning, the situation is such that the water in the heater is maintained at a given temperature and the minute the water cools below this temperature, the main burner is ignited by the pilot light. If it is assumed that the main gas supply drops to a point where the pilot light should cease to burn, it is evident that the moment the water cooled sufficiently, that the thermostat would operate to open the valve to admit gas to the main burner. However, the pilot light being out, when the gas supply was resumed, the gas would not be ignited at the main burner, with the result that the house might be filled with gas fumes to the end that if any open flame should happen to be near by, such as the striking of a match, an explosion would possibly occur. The present invention, however, overcomes this danger because if the pilot flame is not burning, the thermostatic element contracts to close the valve and stop passage of gas to the main burner. The result will be that gas is only supplied to the pilot burner but as this gas is of such a minute quantity, it will never be sufficient to cause any damage.

More specifically stated, in the operation of the device, the thermostatic element 1 is placed in proximity to the pilot flame of the burner which is supplied with gas through the valve $e$. This valve $e$ is normally opened and is maintained open as long as the tube 1 is maintained hot by the pilot flame. In the cold condition of the device when it is mounted in the heater or furnace, the parts are in the relation shown in Figure 1. As soon as the tube 1 becomes heated by the pilot flame, the tube increases in length and this raises the pin 7 at the lower end of the push rod, thereby permitting the spring 13 to expand and convex the diaphragm $c$ downwardly. This pushes the stem 31 downwardly and opens the valve e and maintains the valve open continuously against the force of its spring 35 which would otherwise close it. If the pilot flame should become extinguished the tube 1 contracts, thereby forcing down the push rod 5 and depressing the pin 7. This raises the head of the lever 9 which carries the pin 12. As soon as the contraction of the tube 1 is sufficient the spring 35 will overcome the resistance of the diaphragm c, thereby convexing the diaphragm in an upward direction and closing the valve. In other words, a sufficient contraction of the tube 1 will permit the spring 35 to close the valve.

Subjecting this device to extreme cold, either before or after it is mounted in the heater, will not affect the diaphragm because the downward pressure to which the diaphragm can be subjected can never be more than the force exerted by the spring 13.

It is obvious that the various changes and modifications and variations may be made in practicing the invention in departure from the particular showing of the drawing without departing from the true spirit of the invention.

I claim:

1. In a pilot-control for use in conjunction with a pilot flame of a gas burner, to shut off flow of gas to the burner if the pilot flame becomes extinguished, the combination of a valve-casing, a thermostatic element associated with the valve-casing to be mounted in the vicinity of the pilot-flame so that the same will contract when not heated by the pilot flame, a push-rod connected with the thermostatic element and extending into the valve-casing, a diaphragm of snap-disc form mounted in the casing, a lever engaging the push-rod and having a head adjacent the diaphragm, a valve stem engaging the diaphragm and controlled thereby, a gas valve mounted so as to be moved by said stem, a valve spring associated with the valve for closing the valve when permitted to do so by the contraction of said thermostatic element, and a spring of greater force than the valve spring pressing one end of the lever against the diaphragm and normally holding the valve open against the force of the valve spring, said lever cooperating with the thermostatic element so that when the thermostatic element contracts, the head of the lever recedes from the diaphragm.

2. In a pilot-control for use in conjunction with a pilot flame of a gas burner, to shut off flow of gas to the burner if the pilot flame becomes extinguished, the combination of a valve-casing, a thermostatic element associated with the valve-casing to be mounted in the vicinity of the pilot-flame so that the same will contract when not heated by the pilot flame, a push-rod connected with the thermostatic element and extending into the valve-casing, a diaphragm of snap-disc form mounted in the casing, a lever engaging the push-rod and having a head adjacent the diaphragm, a spring for pressing the head of the lever against the diaphragm and holding the lever against the push-rod, a valve stem engaging the diaphragm and controlled thereby, said valve stem engaging the diaphragm on its side opposite to the lever-head, a gas valve mounted to move with the valve stem, and a valve spring weaker than the first-named spring, associated with the valve for moving the valve and stem toward the diaphragm to close the valve when permitted to do so by the contraction of said thermostatic element, said thermostatic element operating when heated by the pilot flame to permit the first named spring to maintain the valve open.

3. In a pilot control for use in conjunction with a pilot flame of a gas burner, to shut off flow of gas to the burner if the pilot flame becomes extinguished, the combination of a valve casing, a thermostatic element in the form of a tube having a screw thread mounted in the valve casing, a locknut on the thread of the tube for securing the same in any adjusted position, a push-rod located within the tube and extending into the valve-casing, a diaphragm of concavo-convex form mounted in the casing, a lever engaging the push-rod and having a head adjacent the diaphragm, a spring thrusting against the head of the lever opposite the diaphragm for pressing the lever toward the diaphragm and holding the lever against the push-rod, a valve stem on the opposite side of the diaphragm and touching the same, a gas-valve mounted to move with the said stem, and a valve spring weaker than the first-named spring, associated with the valve for moving the valve and stem towards the diaphragm to close the valve when permitted to do so by the contraction of said thermostatic element, said thermostatic element operating when heated by the pilot flame to permit the first-named spring to overcome the valve spring and maintain the valve open.

In testimony whereof, I have signed my name to this specification at Los Angeles, California, this 18th day of July, 1929.

OSCAR J. KAY.